2 Sheets--Sheet 1.

WILLIAM D. GRIMSHAW.

Improvement in Machines for Stamping Sheet Metal Ware.

Figure 1:
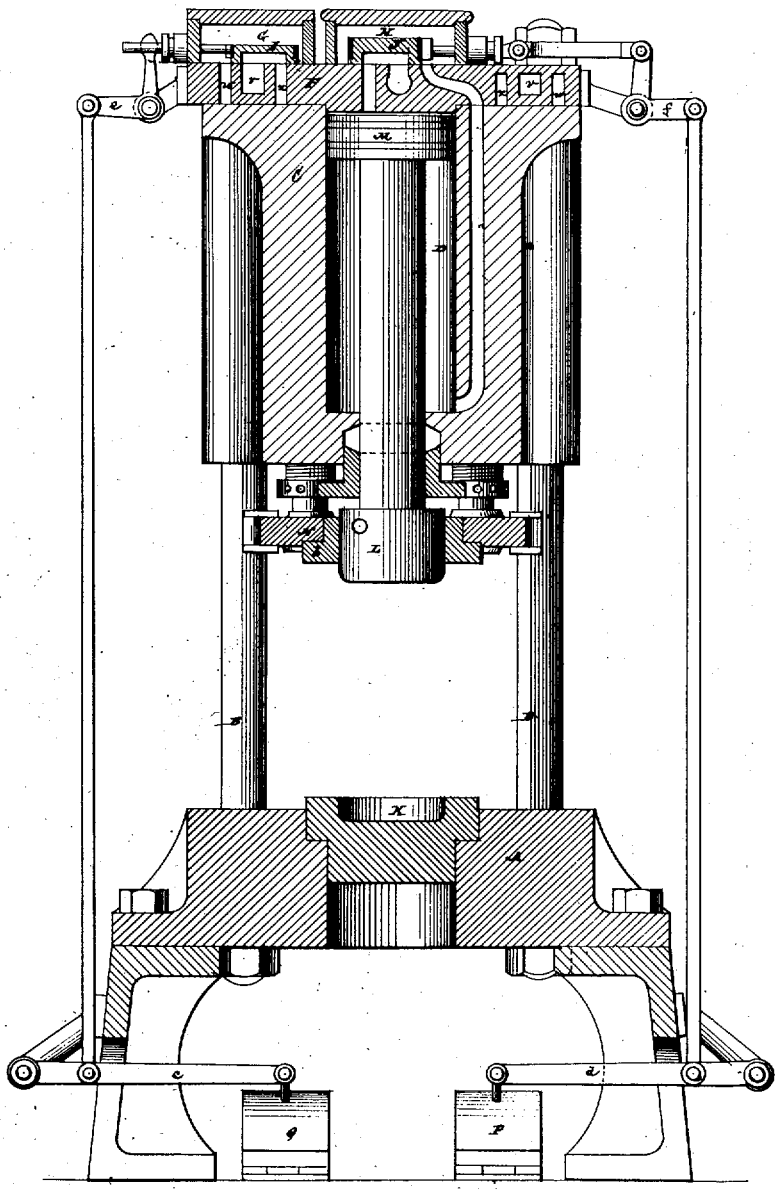

No. 4,765. *Fig. 1* Reissued Feb. 20, 1872.

Witnesses:
Fred Haynes
R. R. Rabeau

W. D. Grimshaw

WILLIAM D. GRIMSHAW. 2 Sheets--Sheet 2.

Improvement in Machines for Stamping Sheet Metal Ware.

No. 4,765. Reissued Feb. 20, 1872.

Witnesses:

Fred Haynes

R. Rabens

W. D. Grimshaw

UNITED STATES PATENT OFFICE.

WILLIAM D. GRIMSHAW, OF ANSONIA, CONNECTICUT, ASSIGNOR OF TWO-THIRDS INTEREST TO F. PARKER ERSKINE, OF CHICAGO, ILLINOIS, AND JOHN B. PEABODY, OF NEW YORK, N. Y.

IMPROVEMENT IN MACHINES FOR STAMPING SHEET-METAL WARE.

Specification forming part of Letters Patent No. 84,625, dated December 1, 1868; reissue No. 4,765, dated February 20, 1872.

*To all whom it may concern:*

Be it known that the following, having reference to the accompanying drawing, is a full, clear, and exact description of an Improvement in Stamps and Dies for Sheet Metal, the same constituting an Improved Steam, Pneumatic, or Hydraulic Compound Cylinder-Engine Press for shaping forms from sheet metal; invented by WILLIAM D. GRIMSHAW, of Ansonia, in the county of New Haven, and State of Connecticut, formerly of Newark, in the county of Essex and State of New Jersey.

Figure 2:
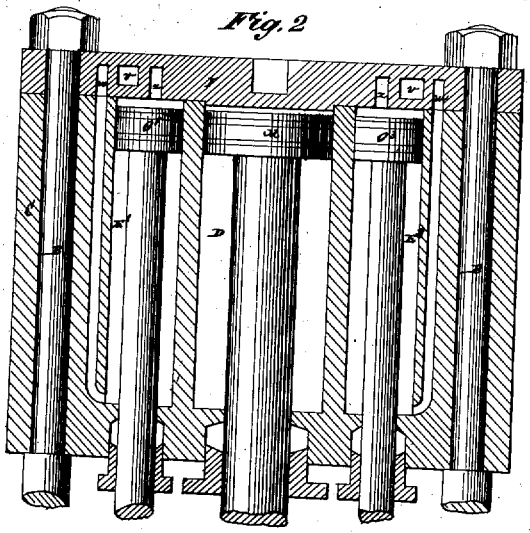
Figure 3:
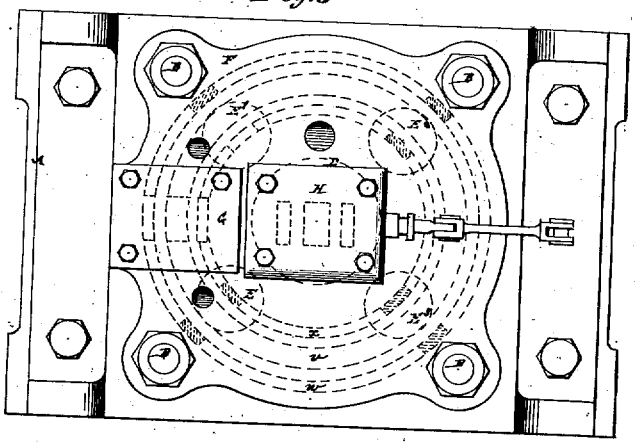
Figure 4:
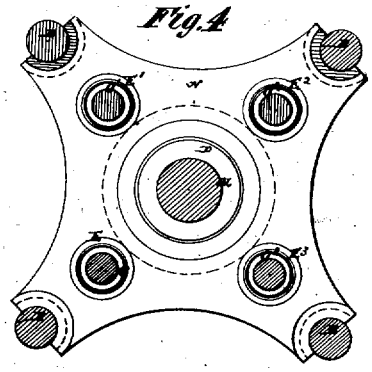

Figure 1 in the drawing represents a partly-sectional front elevation of a press constructed in accordance with my invention; Fig. 2, a sectional elevation of the same in part, taken diagonally through two of the supporting-pillars. Fig. 3 is a plan of the top plate, showing certain valve-chests, valve-ports, and passages therein, or on or connected therewith; and Fig. 4, a horizontal section, in part, showing a holding plate or block, carried by a number of pistons, and serving to bear down on the margin or portion of the sheet-metal plate outside of and around the hollow of the die.

Similar letters of reference indicate corresponding parts throughout the several figures of the drawing.

This invention relates to apparatus for producing sunken sheet-metal work of various kinds, both heavy and light. The sheet-metal plate to be worked into a sunken form is placed on and over a die of suitable configuration, and a holding plate or block carried by a number of pistons is brought down to bear on the margin or portion of the sheet-metal plate outside of and around the hollow of the die. The sheet-metal plate thus held is then subjected to the action of a stamp operated by a central or main piston, and arranged to work through the holding-block to press the sheet-metal plate or portion of it lying over the hollow of the die into the latter. The several pistons may be operated either by steam, compressed air, or water, but preferably water combined with air. The operating-fluid is admitted alternately to opposite ends of the cylinders in which the pistons work, and is exhausted therefrom, accordingly as the pistons require to be raised or lowered, by means of valves controlling passages in the top plate of the press, and passages connected therewith in communication with the ends of the cylinders. These valves are operated to bring the stamp and holding-block down on the work by means of independent treadles, and are reversed, to lift said stamp and holding-block, on relieving pressure from the treadles, which latter serve to graduate the stroke of the pistons and pressure upon the holding-plate.

A is the base-block of the press, which may rest upon or be secured to a suitable foundation. B B B B are pillars standing up from the base-block, and supporting the block or casting C, in which is a main or central cylinder, D, and a number of surrounding smaller cylinders, E $E^1$ $E^2$ $E^3$, preferably disposed at an equal distance from each other. On the top of this block, or rather of a plate, F, mounted thereon, are two receiving-chests, G H, for the fluid by which the press is operated, said chests being provided with valves and ports, the ports in the portion of the plate F over which the chest G is arranged opening into passages *x* and *w*, the one, *x*, of which communicates with the top of the cylinders E $E^1$ $E^2$ $E^3$, and the other, *w*, of which communicates with the bottoms of said cylinders. The exhaust for these cylinders is through a passage, *v*. The other receiving-chest, H, or portion of the plate over which it is arranged, is simply provided with ports or passages for admitting and exhausting from opposite ends of the central or main cylinder D. I and J are the valves, which may be of any suitable construction. In the center of the base-block A is a die, K, of any desired form, and within which the metal plate to be worked or sunk is forced by the action of a stamp, L, attached to the lower end of the rod of the central or main piston M that works in the cylinder D. N is the holding-plate or block that comes down upon the margin of the plate outside of the hollow of the die. This block is composed, in part, of a ring, *b*, through which the stamp L is free to pass, and which has its lower face formed to lie parallel with the top of the die. O $O^1$ $O^2$ $O^3$ are the pistons which work in the cylinders E $E^1$ $E^2$ $E^3$, and which are connected through their rods or lower extensions in a free but positive manner with the holding-block N. The rods of the valves I J are connected with independent treadles P Q by means of levers *c d* and *e f*, with intermediate connections.

The operation is as follows: The metal plate to be sunk or worked is placed upon the face of the die K, after which the operator presses by his foot upon the treadle Q for the purpose of adjusting the valve I so that the working-fluid acting upon the pistons E $E^1$ $E^2$ $E^3$ brings down the holding-block L, or its central portion *b*, upon the plate to firmly hold the margin of the latter, and so that in the subsequent operation, to make the body of the plate conform to the hollow of the die, the same can only be effected by the stretching of the metal. Pressure is then applied by the foot to the treadle P for the purpose of operating the valve J to bring down the stamp L and force the body of the plate or article into which it is formed smooth by reason of the strain upon the metal as it comes from the holding-block and die. Thus from one operation may be produced a deeper dish-shaped article than is ordinarily produced by repeated blows from a drop in the usual way. By the disposition of the pistons which carry the holding-down block around the main piston the pressure upon said block is more perfectly diffused and equalized.

What is here claimed, and desired to be secured by Letters Patent, is—

1. The combination, with the stamp-carrying piston and its cylinder, of a number of pistons and cylinders, arranged around the former, and carrying a holding-block for operation on the margin of the plate to be worked or stamped into the die, substantially as specified.

2. The top plate F, provided with passages *x*, *w*, and *v*, in combination with the cylinders with which said passages connect, essentially as described.

3 The combination of the treadles P Q, and valves controlled by them, with the stamp-operating piston M and outside or surrounding pistons carrying the work-holding block N, substantially as specified.

W. D. GRIMSHAW.

Witnesses:
FRED. HAYNES,
R. E. RABEAU.